US009777110B2

United States Patent
Manabe et al.

(10) Patent No.: US 9,777,110 B2
(45) Date of Patent: Oct. 3, 2017

(54) POLYESTER FILM, LAMINATE INCLUDING THE FILM, AND LAMINATED ASSEMBLY INCLUDING THE LAMINATE AND SEALANT LAYER

(71) Applicant: Toray Industries, Inc., Tokyo (JP)

(72) Inventors: Isao Manabe, Otsu (JP); Atsushi Shiomi, Otsu (JP); Kozo Takahashi, Otsu (JP)

(73) Assignee: Toray Industries, Inc. (JP)

(*) Notice: Subject to any disclaimer, the term of this patent is extended or adjusted under 35 U.S.C. 154(b) by 412 days.

(21) Appl. No.: 14/430,004

(22) PCT Filed: Oct. 16, 2013

(86) PCT No.: PCT/JP2013/078034
§ 371 (c)(1),
(2) Date: Mar. 20, 2015

(87) PCT Pub. No.: WO2014/069236
PCT Pub. Date: May 8, 2014

(65) Prior Publication Data
US 2015/0232611 A1   Aug. 20, 2015

(30) Foreign Application Priority Data

Oct. 31, 2012  (JP) .................. 2012-239838
Oct. 31, 2012  (JP) .................. 2012-239839
Apr. 25, 2013  (JP) .................. 2013-092160

(51) Int. Cl.
*C08G 63/16* (2006.01)
*B32B 27/36* (2006.01)
(Continued)

(52) U.S. Cl.
CPC ............... *C08G 63/16* (2013.01); *B32B 3/30* (2013.01); *B32B 7/02* (2013.01); *B32B 15/09* (2013.01);
(Continued)

(58) Field of Classification Search
CPC ......... C08G 63/16–63/21; B32B 27/08; B32B 27/36; B32B 15/09; B32B 7/02; B32B 3/30; Y10T 428/269
See application file for complete search history.

(56) References Cited

U.S. PATENT DOCUMENTS 6,319,589 B1 *  11/2001  Kobayashi ............ B29C 55/023
428/141

FOREIGN PATENT DOCUMENTS

JP   09156059 A   *   6/1997
JP   10-284340         10/1998
(Continued)

OTHER PUBLICATIONS

Machine translation of JP09-156059. Retrieved Jun. 22, 2017.*
Machine translation of JP10-305542. Retrieved Jun. 22, 2017.*

*Primary Examiner* — Prashant J Khatri
(74) *Attorney, Agent, or Firm* — DLA Piper LLP (US)

(57) ABSTRACT

A polyester film has a maximum surface height on a surface A side (SRmaxA) of 1500 nm to 7000 nm, a maximum surface height on a surface B side (SRmaxB) of 5 nm or more but less than 7000 nm, the SRmaxA and the SRmaxB satisfying the following relation (1), and a strength at break at 25° C. of 200 MPa to 330 MPa in both the longitudinal direction and the width direction.

$$SRmaxA > SRmaxB \qquad (1)$$

11 Claims, 3 Drawing Sheets

(51) Int. Cl.
*B32B 15/09* (2006.01)
*B32B 27/08* (2006.01)
*B32B 7/02* (2006.01)
*B32B 3/30* (2006.01)

(52) U.S. Cl.
CPC ............. *B32B 27/08* (2013.01); *B32B 27/36* (2013.01); *Y10T 428/266* (2015.01); *Y10T 428/269* (2015.01)

(56) References Cited

FOREIGN PATENT DOCUMENTS

| | | | |
|---|---|---|---|
| JP | 10305542 A | * | 11/1998 |
| JP | 2001-180734 | | 7/2001 |
| JP | 2003-311903 | | 11/2003 |
| JP | 2004-362953 | | 12/2004 |
| JP | 2006-236938 | | 9/2006 |
| JP | 2006-341546 | | 12/2006 |
| JP | 2011-204674 | | 10/2011 |
| JP | 2012-238491 | | 12/2012 |
| JP | 2013-6412 | | 1/2013 |

* cited by examiner

POLYESTER FILM, LAMINATE INCLUDING THE FILM, AND LAMINATED ASSEMBLY INCLUDING THE LAMINATE AND SEALANT LAYER

TECHNICAL FIELD

This disclosure relates to a polyester film for battery casings, a polyester film for pharmaceutical packaging, a laminate including the film, and a laminated assembly including the laminate and a sealant layer. In particular, the disclosure relates to a polyester film, a laminate, and a laminated assembly that can be suitably used for battery casings and pharmaceutical packaging.

BACKGROUND

Lithium batteries, also called lithium secondary batteries, are batteries that contain liquid, gel-like polymer, solid polymer, or polymer electrolyte and generate a current through the movement of lithium ions, and contain cathode/anode active materials comprising polymers. The lithium secondary batteries are composed of a cathode current collector (aluminum, nickel), a cathode active material layer (polymer cathode material such as metal oxide, carbon black, metal sulfide, electrolyte solution, or polyacrylonitrile), an electrolyte layer (carbonate electrolyte solution such as propylene carbonate, ethylene carbonate, dimethyl carbonate, or ethylene methyl carbonate, inorganic solid electrolyte composed of lithium salts, gel electrolyte), an anode active material layer (polymer anode material such as lithium metal, alloy, carbon, electrolyte solution, or polyacrylonitrile), an anode current collector (copper, nickel, stainless), and a casing for packaging them. The lithium batteries, because of their high volume efficiency and weight efficiency, have recently been used in various fields as a small high-capacity power source for, for example, personal computers, portable terminals (e.g., cellular phones, PDAs), video cameras, electric vehicles, rechargeable batteries for energy storage, robots, and satellites.

Casings of lithium batteries include metal cans produced by press-working metal into a cylindrical or rectangular parallelepiped container, and bags made of a multilayer film composed of outermost layer/aluminum/sealant layer. The metal cans, however, have a rigid outer wall and thus define the shape of batteries and, since hardware is designed for a battery, the dimensions of the hardware containing the battery is determined by the battery. Due to such a problem of limitation on design, bag-shaped casings made of a multilayer film are becoming preferred. Physical properties and functions required for casings of lithium batteries include moisture resistance, content resistance (resistance to electrolyte solution or other compounds to be contained, i.e., stability to contents), and moldability and, for example, polyamide films are now used as a film material satisfying such physical properties and functions (see, for example, JP 2006-236938 A). However, the polyamide film, which is insufficient in moisture resistance and stability to contents, may be deteriorated when the contents adhere to the film during processing, and there has been a need for improvement. In addition, the use of polyester films are also being investigated (see, for example, JP 2004-362953 A). However, polyester films that have been proposed are not necessarily sufficient in moldability and difficult to deep-draw. A polyester film with improved deep drawability is also proposed (see, for example, JP 2011-204674 A).

Also for pharmaceutical packaging, there is a growing need for a packaging form containing metal foil such as aluminum foil, to prevent degradation of contents, and metal foil with improved moldability to conform to the shape of contents is demanded.

The polyester films described above have improved deep drawability, but have not simultaneously solved the problem of warping of a molded product toward the polyester film side after molding a laminate obtained by laminating metal foil and the problem of occurrence of delamination between the polyester film and the metal foil.

SUMMARY

Our polyester films, due to having a maximum surface height in a specific range on both surfaces, are excellent in warp resistance and reduction of post-molding wrinkles of a molded product and also have reduced delamination between metal foil and a polyester surface.

We thus provide:

(1) A polyester film having a maximum surface height on a surface A side (SRmaxA) of 1500 nm to 7000 nm, a maximum surface height on a surface B side (SRmaxB) of 5 nm or more but less than 7000 nm, the SRmaxA and the SRmaxB satisfying the following relation, and a strength at break at 25° C. of 200 MPa to 330 MPa in both the longitudinal direction and the width direction.

$$\text{SRmaxA} > \text{SRmaxB} \tag{1}$$

(2) The polyester film according to (1), having an internal haze of 10% to 70% and a surface haze of 2% to 20%.
(3) The polyester film according to (1) or (2), having a film width shrinkage in a direction perpendicular to a strain direction at 60% elongation of 25% to 40%.
(4) The polyester film according to any one of (1) to (3), having a thickness of 15 μm to 40 μm.
(5) The polyester film according to any one of (1) to (4), comprising a glycol unit, 95 mol % or more of which is a structural unit derived from ethylene glycol, and a dicarboxylic acid unit, 95 mol % or more of which is a structural unit derived from terephthalic acid.
(6) The polyester film according to any one of (1) to (5), comprising a glycol unit, 95 mol % or more of which is a structural unit derived from 1,4-butanediol, and a dicarboxylic acid unit, 95 mol % or more of which is a structural unit derived from terephthalic acid.
(7) The polyester film according to any one of (1) to (6), which is a laminated film having a polyester A layer and a polyester B layer, the particle concentration in the polyester B layer being lower than that in the polyester A layer.
(8) The polyester film according to any one of (1) to (7), which is used for battery casings.
(9) The polyester film according to any one of (1) to (7), which is used for pharmaceutical packaging.
(10) A laminate, comprising a metal foil (A) with a thickness of 10 μm to 100 μm, and the polyester film according to any one of (1) to (7) formed on at least one surface of the metal foil (A) as an outermost layer, the laminate having a breaking elongation at 25° C. of 20% or more in at least one direction.
(11) A laminated assembly, comprising the laminate according to (10), and further a sealant layer formed on the laminate, the laminated assembly having a configuration of polyester film/metal foil/sealant layer and an opening length at 2% elongation of 40 mm to 100 mm.

The polyester film, due to having a maximum surface height in a specific range on both surfaces, is excellent in warp resistance and reduction of post-molding wrinkles of a molded product and also has reduced delamination between metal foil and a polyester surface, and, due to having a high strength at break at 25° C., provides a laminate, which is obtained by laminating metal foil, with good mold conformability. Thus, the polyester film can be suitably used in a laminated assembly for battery casings adaptable to higher capacities and a laminated assembly for pharmaceutical packaging adaptable to various shapes.

DESCRIPTION OF SYMBOLS

Figure 1:
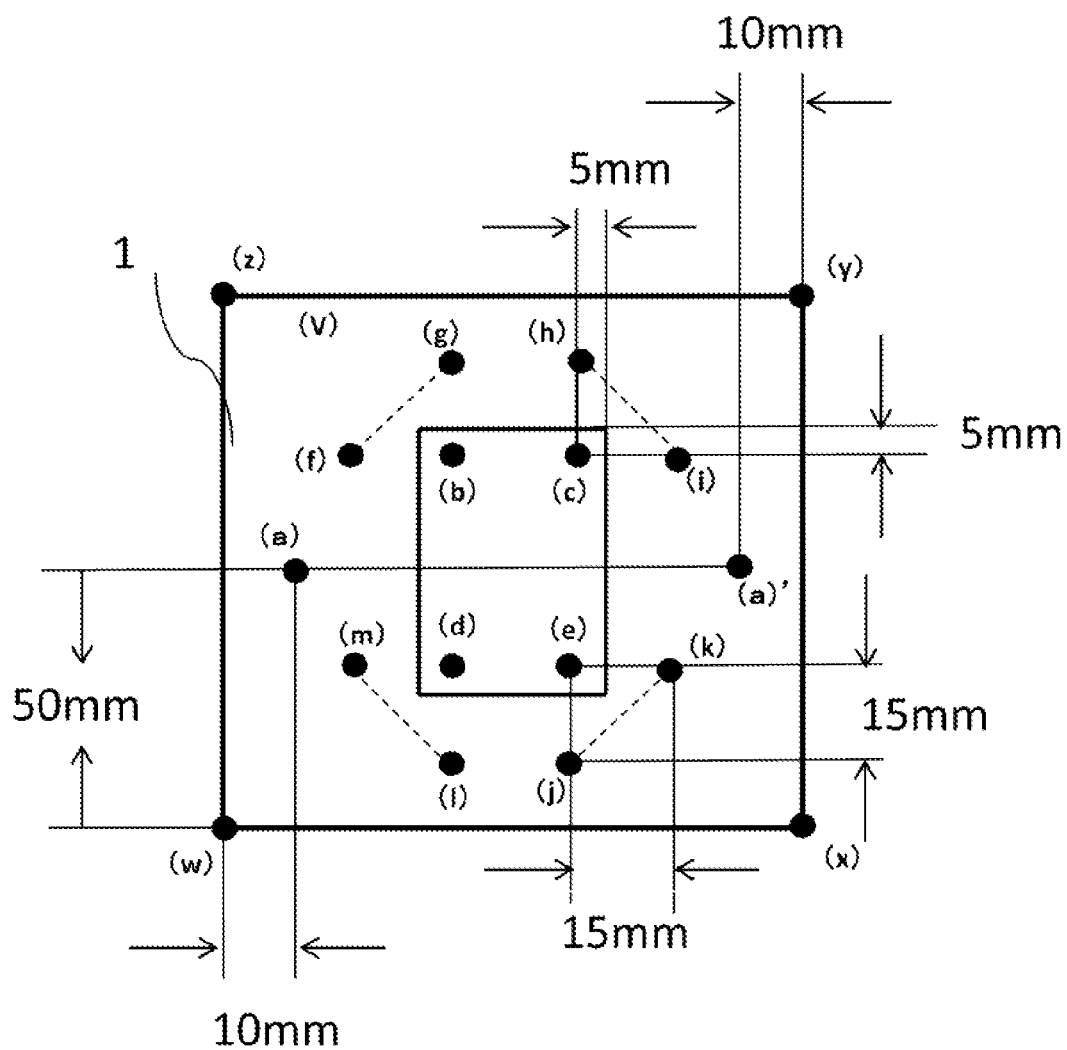
FIG. 1 is a top view of a laminated assembly successfully molded in the evaluation of mold conformability. (a), (a)', and (b) to (m) each denote positions in the laminated assembly successfully molded. (a) and (a)' are located at points shown in FIG. 1 10 mm and 50 mm away from the corners of the laminated assembly. (b), (c), (d), and (e) are located in the protruded part of the laminated assembly successfully molded, and are each located 5 mm inside the corners of the protruded part. (f), (g), (h), (i), (j), (k), (l), and (m) are each located at points 15 mm away (upward, downward, rightward, or leftward) from (b), (c), (d), and (e).

1: Molded product
2: Laminated assembly
3: Male die
4: Female die
5: Laminated assembly before 2% drawing
6: Laminated assembly after 2% drawing

DETAILED DESCRIPTION

To achieve warp resistance and reduce post-molding wrinkles, the polyester film is required to have a maximum surface height on a surface A side (SRmaxA) of 1500 nm to 7000 nm. A maximum surface height on a surface A side of less than 1500 nm leads to increased frictional resistance between the film and a die during molding such as cold pressing after lamination of metal foil, which causes local deformation of the film, resulting in a large warp. A maximum surface height on a surface A side of more than 7000 nm leads to excessively decreased frictional resistance between the film and a die, which causes wrinkles on a molded product. When the maximum surface height (SRmax) on a surface A side is in the above range, the molded product will not have a wrinkle, and warpage can be prevented. The SRmaxA is preferably 1800 nm to 7000 nm, more preferably 2000 nm to 7000 nm, and most preferably 5000 nm to 7000 nm.

The method of controlling the maximum surface height on a surface A side of the polyester film to be in the above range is not limited to a particular method and, for example, it is preferable to have a layer containing inorganic particles and/or organic particles with an average particle diameter of 0.005 μm to 10 μm in an amount of 0.05% by mass or more. To control the maximum surface height to be not more than 7000 nm, the amount of the inorganic particles and/or organic particles in the layer is preferably not more than 3% by mass, more preferably 0.1% by mass to 2% by mass, still more preferably 0.2% by mass to 1.5% by mass, and most preferably 0.4% by mass to 1.0% by mass. By having the layer containing particles with a relatively large particle diameter at a specific concentration as described above, the maximum surface height on a surface A side (SRmaxA) can be controlled to be from 1500 nm to 7000 nm. However, excessive addition of the particles may reduce the breaking elongation of a laminate or reduce the breaking strength of the film. In view of the breaking strength of the film, the particle concentration in the film is preferably 0.2% by mass or less. To minimize the particle concentration in the film while maintaining the maximum surface height on a surface A side in our range, it is only required that a layer structure is formed in which particle-containing layers are laminated on the surfaces of a particle-free layer (e.g., particle-containing layer/particle-free layer/particle-containing layer). To minimize the particle concentration while reducing wrinkles after molding as much as possible, it is only required that a layer structure, for example, low particle concentration layer/high particle concentration layer/low particle concentration layer, is formed. "Low particle concentration" herein means a concentration in a range where during film formation, the film can be wound up without problems such as wrinkles. Thus, it is important to add the particles to the extent that the properties are not impaired.

Particles with an average primary particle diameter of 0.005 μm or more are used. "Particle diameter" as used herein refers to a number average particle diameter and means a particle diameter observed in a cross section of a film. When the shape of the particle is not a perfect circle, the shape is converted into a perfect circle having the same area to determine the particle diameter. The number average particle diameter Dn can be determined by the following procedure (1) to (4).

(1) First, using a microtome, a film is cut in the thickness direction without crushing the cross section, and using a scanning electron microscope, randomly-selected three points are magnified 10,000 times to obtain images for observation. At this time, cutting is carried out in the direction parallel to the film TD (transverse direction).

(2) Next, for each of the particles observed in the cross section in the image, its cross-sectional area S is determined, and its particle diameter d is determined by the following equation.

$$d = 2 \times (S/\pi)^{1/2}$$

(3) Using the particle diameter d obtained and the number of resin particles n, Dn is determined by the following equation.

$$Dn = \Sigma d/n$$

wherein $\Sigma d$ is a sum total of particle diameters of the particles in an observation plane, and n is the total number of the particles in the observation plane.

(4) The above (1) to (3) are carried out at five different points, and the average value is used as the number average particle diameter of the particles. For one observation point, the above-described evaluation is performed at an area of 2500 $\mu m^2$ or more.

Examples of inorganic particles that can be used include wet and dry silica; colloidal silica; metals such as gold, silver, copper, platinum, palladium, rhenium, vanadium, osmium, cobalt, iron, zinc, ruthenium, praseodymium, chromium, nickel, aluminum, tin, zinc, titanium, tantalum, zirconium, antimony, indium, yttrium, and lanthanum; metal oxides such as zinc oxide, titanium oxide, cesium oxide, antimony oxide, tin oxide, indium tin oxide, yttrium oxide, lanthanum oxide, zirconium oxide, aluminum oxide, and silicon oxide; metal fluorides such as lithium fluoride, magnesium fluoride, aluminum fluoride, and cryolite; metal phosphates such as calcium phosphate; carbonates such as calcium carbonate; sulfates such as barium sulfate; metallic soaps such as barium stearate, lithium stearate, calcium stearate, magnesium stearate, and zinc stearate; sodium acetate; magnesium acetate; sodium montanate; talc; kaolin; mica; and carbonaceous materials such as carbon, fullerene, carbon fibers, and carbon nanotubes. Examples of organic particles that can be used include particles composed of compounds such as styrene, silicone, acrylic acids, methacrylic acids, polyesters, and divinyl compounds. Of these, inorganic particles such as wet and dry silica, alumina, titanium dioxide, and barium stearate and particles composed of compounds such as styrene, silicone, acrylic acid, methacrylic acid, polyester, and divinylbenzene are preferably used. Furthermore, these inorganic particles and organic particles may be used in combination of two or more kinds. It is also preferable to subject the film surface to texturing such as embossing or sandblasting in order to control the maximum surface height.

From the standpoint of resistance to delamination from metal foil, the polyester film is required to have a maximum surface height of a surface B side (SRmaxB) of 5 nm or more but less than 7000 nm. For the lower limit 5 nm, the film usually has a maximum surface height of about 5 nm, for example, when particles are not added to the film or when the film is not surface-treated. A maximum surface height of a surface B side of more than 7000 nm decreases the area of adhesion to metal foil, resulting in poor delamination resistance. When the maximum surface height (SRmax) of a surface B side is in the above range, delamination can be prevented. To achieve both winding and delamination resistance during film formation, the SRmaxB is preferably 300 nm or more but less than 7000 nm, more preferably 500 nm or more but less than 7000 nm, and most preferably 1000 nm or more but less than 7000 nm.

To control the maximum surface height of a surface B side to be about 5 nm, it is only required that a substance that influences the surface shape such as particles is not added and the film is not surface-treated. Further, to control the maximum surface height to be 300 nm or more but less than 7000 nm, for example, it is preferable to have a layer containing inorganic particles and/or organic particles with an average particle diameter of 0.005 μm to 10 μm in an amount of 0.01% by mass to 3% by mass.

To advantageously achieve warp resistance, reduced post-molding wrinkles, and resistance to delamination from metal foil, the maximum surface height on a surface A side (SRmaxA) and the maximum surface height of a surface B side (SRmaxB) of the polyester film satisfy relation (1).

$$SRmaxA > SRmaxB \quad (1)$$

The breaking strength at 25° C. of the polyester film is 200 MPa to 330 MPa in both the longitudinal direction and the width direction. For the longitudinal direction and the width direction of the film, refractive indices of the film in any one direction)(0°) and directions at an angle of 15°, 30°, 45°, 60°, 75°, 90°, 105°, 120°, 135°, 150°, and 165° with the direction)(0°) were measured, and the width direction was defined as the direction having a highest refractive index, and the longitudinal direction as the direction perpendicular to the width direction. The refractive indices were measured at 20° C. using an Abbe refractometer available from Atago Co., Ltd. in accordance with JIS-K7105 (1999). When the breaking strength is in the above range, the film has increased strength, and the breaking elongation of a laminate obtained by laminating metal foil can be improved. The reason that the film has increased strength and the breaking elongation of a laminate improves is that stress is less likely to concentrate on metal foil at elongation. In other words, stress at elongation is dispersed not only to metal foil but also to the film. To achieve a breaking strength in the above range, a method is preferably used in which during polyester film formation, the film is stretched at a high stretching magnification, specifically, 10 times or more in area magnification. This stretching method may be a known stretching method such as simultaneous biaxial stretching or sequential biaxial stretching.

The total heat shrinkage at 150° C. in the longitudinal direction and the width direction of the polyester film is preferably 3.0% or less. Furthermore, the total heat shrinkage at 200° C. in the longitudinal direction and the width direction is preferably 10% or less. Within these ranges, delamination between polyester and metal foil upon heat sealing can be prevented. To achieve heat shrinkages at 150° C. and 200° C. in these ranges, the heat treatment temperature after biaxial stretching is preferably 220° C. or higher.

The polyester film preferably has an internal haze of 10% to 70% and a surface haze of 2% to 20%. Although the relationship among internal haze, surface haze, mold conformability, and warp resistance after molding is not clear, the present inventors intensively studied to discover that when the internal haze and the surface haze are in these ranges, both mold conformability and warp resistance after molding can be achieved. The internal haze is more preferably 20% to 65%, and most preferably 30% to 60%. The surface haze is more preferably 3% to 15%, and most preferably 4% to 10%.

The method of controlling the internal haze and the surface haze of the polyester film to be from 10% to 70% and from 2% to 20%, respectively, is not limited to a particular method, and for example, it is preferable to contain inorganic particles and/or organic particles with a number average particle diameter of 1 μm to 10 μm in an amount of 0.1% by mass to 3% by mass based on 100% by mass of the polyester film. By having the layer containing particles with a relatively large particle diameter at a specific concentration as described above, the internal haze and the surface haze can be controlled to be from 10% to 70% and from 2% to 20%, respectively.

To simultaneously have an internal haze of 10% to 70%, a surface haze of 2% to 20%, and a strength at break at 25° C. in the longitudinal direction and the width direction of 200 MPa or more, the polyester film is preferably a laminated film having a polyester A layer and a polyester B layer, the particle concentration in the polyester B layer being lower than that in the polyester A layer. The polyester B layer may be any layer having a particle concentration lower than that in the polyester A layer, and the content of inorganic particles and/or organic particles is preferably 0% by mass to 2.5% by mass based on 100% by mass of the polyester B layer, more preferably 0% by mass to 2% by mass, and most preferably 0.01% by mass to 1% by mass.

The polyester film, from the standpoint of prevention of post-molding warpage of a laminate obtained by laminating metal foil, preferably has a film width shrinkage in a direction perpendicular to the elongation direction at 60% elongation of 25% to 40%. The film width shrinkage is measured by a method described in Evaluation Method: (17) Film Width Shrinkage at 60% Elongation below. Polyester films, when elongated in one direction, shrink in a direction perpendicular to the elongation direction, and within the limits of elastic deformation, such a property is commonly expressed as a Poisson's ratio by numerical values. We determined that one of the causes of warpage that occurs after molding a laminate obtained by laminating metal foil is a strain in the deformation direction and a strain in a direction perpendicular to the deformation direction, and discovered that warpage can be reduced when the width shrinkage in a direction perpendicular to the strain direction at 60% elongation is in a specific range. The film width shrinkage is ideally 0%, but it is technically difficult to reduce it to 25% or less due to the properties of the polyester film. A film width shrinkage of 40% or more may increase warpage. It is preferably 37% or less, more preferably 35% or less, and most preferably 30% or less. We discovered that the film width shrinkage can be controlled to be from 25% to 40% by adding particles of 0.1 μm to 15 μm to the polyester film in an amount in the range of 0.15% by mass to 20% by mass based on the polyester film, and particles with a larger particle size are more effective. "Particles" as used herein include inorganic particles and organic particles.

The polyester constituting the polyester film preferably comprises a glycol unit, 90 mol % or more of which is a structural unit derived from ethylene glycol, and a dicarboxylic acid unit, 90 mol % or more of which is a structural unit derived from terephthalic acid, and more preferably comprises a glycol unit, 95 mol % or more of which is a structural unit derived from ethylene glycol, and a dicarboxylic acid unit, 95 mol % or more of which is a structural unit derived from terephthalic acid. The composition as given above is similar to the composition of homopolymeric polyethylene terephthalate and, therefore molecular chains are uniformly oriented, which increases the strength at break.

The polyester constituting the polyester film generally refers to a high molecular compound whose principal bond in its main chain is an ester bond. Polyester resins can be obtained typically by polycondensation reaction of a dicarboxylic acid or a derivative thereof and a glycol or a derivative thereof. As used herein, "dicarboxylic acid unit (structural unit)" or "diol unit (structural unit)" means a divalent organic group formed after the portion to be removed by polycondensation is removed, and is represented by the following general formulae.

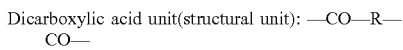
Dicarboxylic acid unit(structural unit): —CO—R—CO—

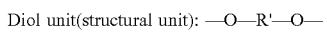
Diol unit(structural unit): —O—R'—O—

(In the formulae, R and R' are each a divalent organic group. R and R' may be the same or different.)

Examples of the glycol or derivative thereof that gives the polyester include, in addition to ethylene glycol, aliphatic dihydroxy compounds such as 1,2-propanediol, 1,3-propanediol, 1,3-butanediol, 1,5-pentanediol, 1,6-hexanediol, and neopentyl glycol; polyoxyalkylene glycols such as diethylene glycol, polyethylene glycol, polypropylene glycol, and polytetramethylene glycol; alicyclic dihydroxy compounds such as 1,4-cyclohexanedimethanol and spiroglycol; aromatic dihydroxy compounds such as bisphenol A and bisphenol S; and derivatives thereof.

Examples of the dicarboxylic acid or derivative thereof that gives the polyester include, in addition to terephthalic acid, aromatic dicarboxylic acids such as isophthalic acid, phthalic acid, 2,6-naphthalenedicarboxylic acid, diphenyldicarboxylic acid, diphenylsulfonedicarboxylic acid, diphenoxyethanedicarboxylic acid, and 5-sodium sulfonedicarboxylic acid; aliphatic dicarboxylic acids such as oxalic acid, succinic acid, adipic acid, sebacic acid, dimer acid, maleic acid, and fumaric acid; alicyclic dicarboxylic acids such as 1,4-cyclohexanedicarboxylic acid; oxycarboxylic acids such as p-oxy benzoic acid; and derivatives thereof. Examples of derivatives of dicarboxylic acid include ester compounds such as dimethyl terephthalate, diethyl terephthalate, 2-hydroxyethyl methyl terephthalate, dimethyl 2,6-naphthalene dicarboxylate, dimethyl isophthalate, dimethyl adipate, diethyl maleate, and dimethyl dimerate.

Similarly, to increase the strength at break at 25° C., the polyester film preferably comprises a glycol unit, 90 mol % or more of which is a structural unit derived from 1,4-butanediol, and a dicarboxylic acid unit, 90 mol % or more of which is a structural unit derived from terephthalic acid, and more preferably comprises a glycol unit, 95 mol % or more of which is a structural unit derived from 1,4-butanediol, and a dicarboxylic acid unit, 95 mol % or more of which is a structural unit derived from terephthalic acid. The composition as given above is similar to the composition of homopolymeric polybutylene terephthalate and, therefore, molecular chains are uniformly oriented, which increases the strength at break.

In a laminated film having a polyester A layer and a polyester B layer, the compositions of components of the polyester layers may be the same or different. However, in the case of a laminate of a polyester layer A comprising polyethylene terephthalate and a polyester layer B comprising polybutylene terephthalate, where the difference in glass transition temperature Tg between the two layers is 10° C. or more, either of the layers preferably accounts for 60 mol % or more of the polyester layer from the standpoint of increase in strength at break.

From the standpoint of mold conformability after metal foil lamination and warp resistance after molding, the thickness of the polyester film is preferably 12 μm to 40 μm, more preferably 16 μm to 38 μm, and most preferably 18 μm to 30 μm.

From the standpoint of adhesion to metal foil, it is preferable to form an adhesion-improving layer on the surface to which metal foil is laminated. This provides excellent adhesion and improves adhesive strength. Examples of the method of forming an adhesion-improving layer include, but are not limited to, coating of the film surface with resin (e.g., melt coextrusion, hot-melt coating, and in-line and off-line coating using a solvent other than water and a water-soluble and/or water-dispersible resin). In particular, in-line coating, in which a coating agent is applied to one surface of a film before completion of oriented crystallization, and the coated film is stretched in at least one direction and heat-treated to complete oriented crystallization, is preferred in terms of formation of a uniform coating and productivity. When the adhesion-improving layer is formed, examples of resins that provide adhesiveness that can be used include, but are not limited to, acrylic resins, urethane resins, polyester resins, olefin resins, fluorine resins, vinyl resins, chlorine resins, styrene resins, various graft resins, epoxy resins, and silicone resins, and mixtures of these resins can also be used. From the standpoint of adhesion, it is preferable to use a polyester resin, an acrylic resin, or a urethane resin. When a polyester resin is used in the form of an aqueous coating liquid, a water-soluble or water-dispersible polyester resin is used, and for water solubilization or water dispersibilization, it is preferable to copolymerize a sulfonate group-containing compound or a carboxylate group-containing compound. When an acrylic resin is used in the form of an aqueous coating liquid, the acrylic resin needs to be in the state of being dissolved or dispersed in water, and a surfactant (including, but not limited to, polyether compounds) may be used as an emulsifier.

To further improve the adhesiveness, various cross-linking agents can be combined with the resin in the adhesion-improving layer. Resins commonly used as a cross-linking agent include melamine resins, epoxy resins, and oxazoline resins.

Particles added to the adhesion-improving layer may be inorganic particles or organic particles, and inorganic particles are more preferred because they improve lubriciousness and blocking resistance. Examples of inorganic particles that can be used include silica, alumina, kaolin, talc, mica, calcium carbonate, and titanium.

To improve the adhesiveness to a metal foil (A), it is also preferable to subject the surface of the polyester film to corona treatment, plasma treatment, ozonation, or adhesion-improving treatment.

The laminate is preferably a laminate having a metal foil (A) with a thickness of 10 μm to 100 μm on at least one surface of a polyester film. Examples of metals constituting the metal foil include aluminum, stainless, copper, nickel, titanium, tin, silver, gold, zinc, and iron, which can be used depending on the intended use. In particular, from the standpoint of moldability, gas barrier properties, water vapor barrier properties, strength, and economical efficiency, a layer containing aluminum is preferred. The metal foil may be single aluminum or an aluminum alloy containing, for example, copper, zinc, manganese, magnesium, silicon, lithium, or iron. The content of aluminum in the metal foil is preferably 95% by mass or more, and pure aluminum or aluminum/iron alloy is preferably used. A thickness of less than 10 μm leads to poor moldability in molding such as cold pressing. A thickness of more than 100 μm cannot improve properties, and, in addition, is economically disadvantageous.

The laminate is required to have a breaking elongation at 25° C. of 20% or more in at least one direction. As used herein, "breaking elongation" refers to an elongation at the time when a film is broken, as determined by a tensile test of a film sample cut into a rectangular shape with a test length of 50 mm under the conditions of 25° C., 63% Rh, and a strain rate of 300 mm/min. From the standpoint of conformability in deep drawing, the breaking elongation is preferably 20% or more in both the longitudinal direction and the width direction. Furthermore, the breaking elongation is more preferably 30% or more in both the longitudinal direction and the width direction, and most preferably 38% or more in terms of productivity and mold conformability because film breakage is less likely to occur during film formation. A breaking elongation of more than 45% is most preferred for mold conformability, but it may lead to a too high stretching magnification in production of a polyester film, which can cause breakage during film formation, resulting in low productivity. When the elongation at break is less than 20% in both the directions, the laminate has poor mold conformability to metal foil, and breakage of metal foil occurs during molding, resulting in poor molding. For the elongation at break to be 20% or more in at least one direction, the breaking strength of the polyester film is preferably 200 MPa or more. For the elongation at break to be 30% or more in both the longitudinal direction and the width direction, the breaking strength of the polyester film is preferably 250 MPa to 330 MPa, and in order for the elongation at break to be 38% or more, the breaking strength is preferably 280 MPa to 330 MPa. For the breaking elongation to be 45% or more, the breaking strength of the polyester film is preferably 330 MPa or more, in which case it is preferred that the area stretching magnification be 17 times or more and the intrinsic viscosity of resin be 0.9 or more.

The metal foil is preferably subjected to chemical conversion on at least one surface in order to improve the adhesion to the polyester film or any other layer. Examples of the method of chemical conversion include chromic acid chromate conversion; phosphoric acid chromate conversion; chromate conversion by coating; non-chrome, such as zirconium, titanium, or zinc phosphate, chemical conversion (by coating); and boehmite conversion.

The polyester film and the metal foil (A) may be laminated by any method and, from the standpoint of adhesion, dry lamination using adhesive is preferably used. The adhesive used may be thermosetting or thermoplastic, and thermosetting adhesives are preferred. Examples include adhesives made of polyurethane resins, polyester resins, polyvinyl chloride resins, rubber resins such as styrene-butadiene copolymer, acrylonitrile-butadiene copolymer, methyl methacrylate-butadiene copolymer, chloroprene, and polybutadiene, polyacrylate resins, polyvinylidene chloride resins, polybutadiene, carboxyl-modified products of these resins, epoxy resins, cellulose derivatives, ethylene-vinyl acetate copolymer, polyethylene oxide, acrylic resins, and lignin derivatives. From the standpoint of adhesion between the polyester film and the metal foil, adhesives made of polyurethane resins and polyester resins are preferred.

To provide sealability and improve electrolyte resistance and barrier properties, it is preferable to further form a sealant layer on the laminate to form a laminated assembly having a configuration of polyester film/metal foil (A)/sealant layer. Examples of the sealant film preferably used include ethylene resins such as low-density polyethylene, medium-density polyethylene, high-density polyethylene, linear low-density polyethylene, and ethylene-butene copolymer; propylene resins such as homopolypropylene, ethylene-propylene copolymer, and ethylene-propylene-butene copolymer; methylpentene resins; polyolefin resins such as cyclic olefin resins; and vinyl chloride resins such as polyvinyl chloride, copolymers of vinyl chloride and ethylene, propylene, vinyl acetate, allyl chloride, allyl glycidyl ether, acrylate, methacrylate, and vinyl ether that can be copolymerized with vinyl chloride monomer, and mixtures thereof.

Further, to improve the adhesion between the metal foil and the sealant film, it is also preferable to interpose a modified polyolefin resin between the metal foil and the sealant film. As used herein, "modified polyolefin resin" refers to a polyolefin resin containing one or more polar groups either at one end, both ends, or internally. As used herein, "polar group" refers to a functional group containing a strongly electronegative atom such as oxygen or nitrogen, and specifically refers to a functional group such as amide, carboxyl, or hydroxyl, and a substituent containing such a functional group.

Such a modified polyolefin resin is preferably a polyolefin resin modified with an unsaturated dicarboxylic acid or by oxidative degradation of resin, more preferably a modified polyolefin resin modified with unsaturated dicarboxylic acid. Specifically, modified polyolefin resins obtained by modifying a polyolefin resin (e.g., low-density polyethylene, medium-density polyethylene, high-density polyethylene, linear low-density polyethylene, ethylene-α-olefin copolymer obtained by polymerization using a metallocene catalyst, polypropylene, ethylene-propylene copolymer, methylpentene polymer, or random copolymer or block copolymer of α-olefin monomers) with an unsaturated dicarboxylic acid (e.g., acrylic acid, methacrylic acid, maleic anhydride, or fumaric acid) are preferred in terms of adhesion to the polyester film. Particularly preferred unsaturated dicarboxylic acid is maleic anhydride. In other words, a modified polyolefin resin obtained by modifying a polyolefin resin with maleic anhydride is particularly preferred.

Examples of the modified polyolefin resin obtained by modification with an unsaturated dicarboxylic acid include various resins such as "UMEX" available from Sanyo Chemical Industries, Ltd., "ADMER" available from Mitsui Chemicals, Inc., "MODIC" available from Mitsubishi Chemical Corporation, "OREVAC" and "LOTADER" available from Arkema, and "TOYOTAC" available from Toyo Kasei Kogyo Co., Ltd. Examples of the modified polyolefin resin obtained by modification by oxidative degradation of resin include "VISCOL" and "SANWAX" available from Sanyo Chemical Industries, Ltd.

From the standpoint of prevention of post-molding warpage, the laminated assembly preferably has an opening length at 2% elongation of 40 mm to 100 mm, more preferably 50 mm to 100 mm, and most preferably 75 mm to 100 mm. As used herein, "opening length at 2% elongation" refers to a value determined by the method described in Evaluation Method (18). An opening length at 2% elongation of less than 40 mm may lead to a large warp after cold press molding. An opening length at 2% elongation of 100 mm represents that the strain on the metal foil (A) is small even after 2% elongation, leading to a small warp after cold press molding. To achieve an opening length at 2% elongation of 40 mm to 100 mm, one preferred method is to use aluminum foil and a polyester film having a film width shrinkage in a direction perpendicular to the elongation direction at 60% elongation of 25% to 37% as the metal foil and the polyester film constituting the laminate.

The polyester film is preferably used for battery casings. For retention of battery performance, the battery casing requires water vapor barrier properties to prevent penetration of water vapor, electrolyte resistance to resist swelling by electrolyte solution, and deep drawability meeting the needs for higher capacities. Using the polyester film provides a laminate, which is obtained by laminating metal foil, with good mold conformability, and using the polyester film in battery casing applications allows adaptation to higher capacities. Further, by using the polyester, the laminated assembly is provided with excellent warp resistance after molding, and thus can be used without a problem during the process.

Further, the polyester film is preferably used also in pharmaceutical packaging applications. Pharmaceutical packages require gas barrier properties and water vapor barrier properties to prevent degradation of contents, and require printability to meet specifications where printing is performed. Furthermore, there is a growing need for deep drawability to accommodate contents of various shapes. To achieve high gas barrier properties and high water vapor barrier properties, it is preferable to have metal foil. However, since metal foil is difficult to deep-draw, it is necessary to laminate a film and mold the metal foil together with the film. Using the polyester film provides a laminate, which is obtained by laminating metal foil, with good mold conformability and also warp resistance after molding. Thus, by using the polyester film in pharmaceutical packaging applications, a very excellent pharmaceutical packaging laminate that is able to accommodate pharmaceuticals of various shapes can be obtained.

An outline of the method of producing the polyester film, the laminate, and the laminated assembly is given below. First, the polyester film is produced. For this purpose, the polyester material mentioned above is first melt-extruded by a known method and made to adhere to a casting drum controlled at about 10° C. to 35° C. to avoid crystallization of polyester, thereby obtaining a cast sheet. The method of adhesion may be a known method such as electrostatic application or air-knife coating. The cast sheet obtained is then biaxially stretched for orientation using a known method. The biaxial stretching may be carried out by a known method such as sequential biaxial stretching, simultaneous biaxial stretching, or tubular biaxial stretching. In the stretching, a layer to improve adhesion to metal foil may optionally be formed after uniaxial stretching. Here, the area stretching magnification, a product of magnifications of a first stretching and a second stretching, is 10 or more, which is important for the laminate to have a breaking elongation of 20% or more in at least one direction. For the same reason, the stretching temperature is preferably not less than Tg and not more than Tg+25° C. These conditions can be varied if the effects of the polyester film, the laminate, and the laminated assembly can be produced. After the biaxial stretching, it is preferable to perform heat treatment from the standpoint of, for example, dimensional stability. When the polyester material is composed mainly of polyethylene terephthalate, the heat treatment is preferably carried out at a temperature of 190° C. to 250° C. for a time of 1 second to 120 seconds, and when the polyester material is composed mainly of polybutylene terephthalate, the heat treatment is preferably carried out at a temperature of 185° C. to 220° C. for a time of 1 second to 120 seconds. After the heat treatment, surface treatment such as corona treatment is performed as required to obtain a polyester film.

The polyester film obtained is then made to adhere to metal foil to obtain a laminate. Though not critical, it is preferable to use dry lamination for the adhesion. The adhesive used may be a urethane adhesive, acrylic adhesive, ether adhesive, epoxy adhesive, or the like. After the adhesion, the laminate may be aged as required in order to improve adhesive strength. Thereafter, a sealant is made to adhere to the laminate using a known method such as dry lamination or heat lamination to obtain a laminated assembly.

EXAMPLES

Evaluation Method
The polyester film were produced and evaluated by the following method.
(1) Composition of Polyester
A polyester resin and a film were dissolved in hexafluoroisopropanol (HFIP), and the contents of monomer residues and by-product diethylene glycol were quantitatively determined using $^1$H-NMR and $^{13}$C-NMR.
(2) Film Thickness, Layer Thickness
The total thickness of a film was measured using a dial gauge in such a manner that the film was cut to 200 mm×300 mm, and thicknesses of randomly-selected five points of each sample were measured and averaged. The thickness of each layer of the laminated film was determined in such a manner that the film was embedded in epoxy resin and cut with a microtome cross-sectionally, and the cross section was observed at a magnification of 5000 under a transmission electron microscope (TEM H7100 manufactured by Hitachi Ltd.).

(3) Average Particle Diameter

Particles with an average primary particle diameter of 5 nm or more are used for measurement of average particle diameter. "Particle diameter" as used herein refers to a number average particle diameter and means a particle diameter observed in a cross section of a film. When the shape of the particles is not a perfect circle, the shape is converted into a perfect circle having the same area to determine the particle diameter. The number average particle diameter is determined by the following procedure (a) to (d).

(a) First, using a microtome, a film is cut in the thickness direction without crushing the cross section, and a scanning electron microscope is used to obtain a magnified image for observation. At this time, cutting is carried out in the direction parallel to the film TD (transverse direction).

(b) Next, for each of the particles observed in the cross section in the image, its cross-sectional area S is determined, and its particle diameter d is determined by the following equation.

$$d = 2 \times (S/\pi)^{1/2}$$

(c) Using the particle diameter d obtained and the number of resin particles n, Dn is determined by the following equation.

$$Dn = \Sigma d/n$$

wherein $\Sigma d$ is a sum total of particle diameters of the particles in an observation plane, and n is the total number of the particles in the observation plane.

(d) The above (a) to (c) are carried out at five different points, and the average value is used as the number average particle diameter of the particles. For one observation point, the above-described evaluation is performed at an area of 2500 $\mu m^2$ or more.

(4) Particle Content in Film

One gram of a film was charged into 200 ml of 1 N KOH methanol solution and heated to reflux to dissolve polymer. To the solution after completion of dissolution, 200 ml of water was added, after which the resulting mixture was centrifuged to precipitate particles, and a supernatant fluid was removed. Furthermore, water was added to the particles, and the resulting mixture was washed and centrifuged. This procedure was repeated twice. The particles thus obtained were dried, and its mass was measured to determine the content of the particles.

(5) Maximum Surface Height of Polyester Film (SRmax)

Using a three dimensional surface roughness meter ETB-30HK manufactured by Kosaka Laboratory Ltd., measurements were made by a stylus method under the following conditions. In a measuring area of a polyester film, image processing is performed such that the highest point and the lowest point are sandwiched between lines parallel to the average plane. Maximum height SRmax is defined as the distance between the parallel lines at the highest point and the lowest point. In a laminate of a film and metal foil adhering to each other, the film and the metal foil were separated, and a maximum surface height of the surface of the film on the side of metal foil adhesion is measured. At this time, it is preferable to separate the film and the metal foil after melting the adhesive between them with an appropriate solvent so as not to damage the film surface.

Stylus tip diameter: 2 μm, stylus load: 10 mg, measuring length: 1-mm feed

Pitch: 50 μm, the number of measurements: 40, cutoff value: 0.25 mm.

(6) Longitudinal Direction and Width Direction of Polyester Film

Refractive indices of the film in any one direction)(0°) and directions at an angle of 15°, 30°, 45°, 60°, 75°, 90°, 105°, 120°, 135°, 150°, and 165° with the direction)(0°) were measured, and the width direction was defined as the direction having a highest refractive index, and the longitudinal direction as the direction perpendicular to the width direction. The refractive indices were measured with an Abbe refractometer using Sodium D-line (wavelength: 589 nm) as a light source.

(7) Breaking Strength of Polyester Film

A film was cut in the longitudinal direction and the width direction into a rectangular shape 150 mm long and 10 mm wide to prepare a sample. Under the conditions of 25° C. and 63% Rh, tensile tests were performed for the longitudinal direction and the width direction of the film using a tensile tester (Tensilon UCT-100 manufactured by ORIENTEC Co., LTD.) at a crosshead speed of 300 mm/min, a width of 10 mm, and a sample length of 50 mm, and the load on the film at the time of breakage was read. Breaking strength was defined as the value obtained by dividing the load by the cross-sectional area of the sample before testing (laminate thickness×10 mm). Measurements were made for five times, and the average was used.

(8) Breaking Elongation of Polyester Film and Laminate

A film and a laminate were cut in the longitudinal direction and the width direction into a rectangular shape 150 mm long and 10 mm wide to prepare a sample. Under the conditions of 25° C. and 63% Rh, tensile tests were performed for the longitudinal direction and the width direction of the film using a tensile tester (Tensilon UCT-100 manufactured by ORIENTEC Co., LTD.) at a crosshead speed of 300 mm/min, a width of 10 mm, and a sample length of 50 mm. Breaking elongation was defined as the elongation read at the time of breakage. Measurements were made five times and the average was used.

(9) Method of Preparing Laminated Assembly

On the metal foil (A) constituting the laminate, a two-layer coextruded film obtained by coextrusion of maleic acid-modified polypropylene resin and polypropylene (maleic acid-modified polypropylene resin layer: 20 μm, polypropylene resin layer: 60 μm) was placed as a sealant with the maleic acid-modified polypropylene resin layer being located at the side of aluminum foil, and laminated on the polyester films of Examples and Comparative Examples by thermocompression bonding (150° C., 0.3 MPa, 2 m/min) using a laminator to prepare a laminated assembly of polyester film/metal foil/sealant.

(10) Mold Conformability of Laminated Assembly

Figure 2:
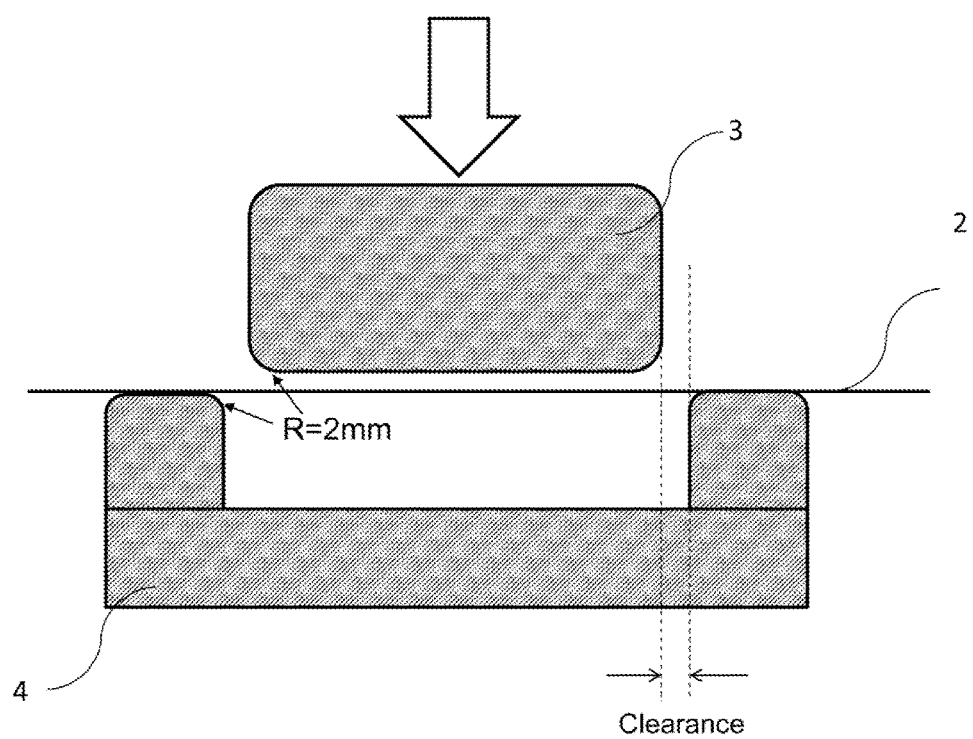
FIG. 2 is a schematic side view of a die consisting of a rectangular male die and a rectangular female die.
Figure 3:
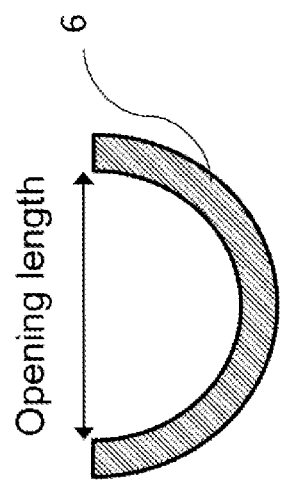
FIG. 3 is a schematic view of a sample used for measurement of opening length at 2% elongation.
Figure 3:

The laminated assembly obtained in (9) was cut to a size of 100 mm×100 mm, and using a die consisting of a rectangular male die of 50 mm×30 mm (R at a corner formed by the surface that comes into contact with the laminated assembly and a side: 2 mm, FIG. 2) and a female die (R at a corner formed by the surface that comes into contact with the laminated assembly and a side: 2 mm, FIG. 2), the clearance between the male die and the female die being 0.5 mm, the laminated assembly was set on the female die such that the sealant side was at the side of the male die, and press-molded (pressure: 0.1 MPa). Evaluation was made according to the following criteria.

S: Successfully molded to 7 mm or more (no breakage)

A: Breakage occurred at 5 mm or more and less than 7 mm

B: Breakage occurred at 4 mm or more and less than 5 mm

C: Breakage occurred at less than 4 mm

(11) Warp Resistance of Laminated Assembly

The laminated assembly successfully molded without breakage in (10) mold conformability evaluation was placed on a horizontal stand with the protruded part facing upward. The average height of lifting of four corners of the laminated assembly (FIG. 1: (w), (x), (y), and (z)) from the stand was evaluated according to the following criteria.

S: Average warpage height is less than 1 cm
A: Average warpage height is 1 cm or more but less than 2 cm
B: Average warpage height is 2 cm or more but less than 3 cm
C: Average warpage height is 3 cm or more but less than 4 cm
D: Average warpage height is 4 cm or more

(12) Delamination Resistance

The laminated assembly successfully molded without breakage in (10) mold conformability evaluation was treated under the conditions of a temperature of 60° C. and a relative humidity of 90% RH for 168 hours with a pressure cooker available from Tabai Espec Corporation, after which the occurrence of delamination between the polyester film and the metal foil (A) was observed. The occurrence was visually observed, and those which apparently experienced delamination were evaluated as poor. When visual evaluation was not possible, cross sections of randomly-selected five points in the protruded part formed by molding were observed under a SEM (500X), and evaluation was made according to the following criteria based on whether there was a point where the distance between the polyester film and the metal foil (A) was 100 μm or more.

A: There is no point where the distance is 100 μm or more.
C: There is at least one point where the distance is 100 μm or more.

Specific examples of production of the polyester film will be described below.

(13) Post-Molding Wrinkles

The laminated assembly successfully molded without breakage in (10) mold conformability evaluation is schematically shown in FIG. 1. First, thicknesses at (a) and (a)' are measured. Of the thicknesses at (a) and (a)', thinner one is used as a standard thickness. Next, thicknesses at between (f) and (g), (h) and (i), (j) and (k), and (l) and (m) are measured, (f), (g), (h), (i), (j), (k), (l), and (m) each being a point 15 mm away from (b), (c), (d), and (e) of FIG. 1 located in the protruded part of the laminated assembly successfully molded and 5 mm inside the corners of the protruded part. The wrinkle was evaluated according to the following criteria.

A: The differences between the standard thickness and the thicknesses at between (f) and (g), (h) and (i), (j) and (k), and (l) and (m) are all within a range of ±10%.
C: At least one of the differences between the standard thickness and the thicknesses at between (f) and (g), (h) and (i), (j) and (k), and (l) and (m) is without a range of ±10%.

(14) Total Heat Shrinkage at 150° C. in Width Direction and Longitudinal Direction of Polyester Film A film was cut in the longitudinal direction and the width direction into a rectangular shape 150 mm long and 10 mm wide to prepare a sample. Reference lines were drawn on the sample at an interval of 100 mm, and the sample, with a 3-g weight hung therefrom, was heat-treated in a hot-air oven heated at 150° C. for 30 minutes. The interval between the reference lines after the heat treatment was measured, and from the change in interval between the reference lines before and after heating, a heat shrinkage was calculated. Measurements were made in the longitudinal direction and the width direction each for five samples, and their average values were used for evaluation. Total heat shrinkage at 150° C. was defined as the total of the average value in the longitudinal direction and the average value in the width direction.

(15) Total Heat Shrinkage at 200° C. in Width Direction and Longitudinal Direction of Polyester Film A film was cut in the longitudinal direction and the width direction into a rectangular shape 150 mm long and 10 mm wide to prepare a sample. Reference lines were drawn on the sample at an interval of 100 mm, and the sample, with a 3-g weight hung therefrom, was heat-treated in a hot-air oven heated at 200° C. for 10 minutes. The interval between the reference lines after the heat treatment was measured, and from the change in interval between the reference lines before and after heating, a heat shrinkage was calculated. Measurements were made in the longitudinal direction and the width direction each for five samples, and their average values were used for evaluation. Total heat shrinkage at 200° C. was defined as the total of the average value in the longitudinal direction and the average value in the width direction.

(16) Internal Haze, Surface Haze

In accordance with JIS K 7105 (1985), a film haze was measured using a haze meter (HGM-2DP manufactured by Suga Test Instruments Co., Ltd.). Thereafter, the film was placed in a glass cell for liquid measurement, and the cell was filled with 1,2,3,4-tetrahydronaphthalene. An internal haze was measured using a haze meter (HGM-2DP manufactured by Suga Test Instruments Co., Ltd.) similarly to the film haze. Surface haze was defined as a value obtained by subtracting the internal haze from the film haze. Measurements of the film haze and the internal haze were made at randomly-selected five points, and their average values were employed.

(17) Film Width Shrinkage at 60% Elongation

A polyester film was cut in the longitudinal direction and the width direction into a rectangular shape 150 mm long and 10 mm wide to prepare a sample. Under the conditions of 25° C. and 63% Rh, the film was drawn in the longitudinal direction and the width direction using a tensile tester (Tensilon UCT-100 manufactured by ORIENTEC Co., LTD.) at a crosshead speed of 300 mm/min, a width of 10 mm, and a sample length of 50 mm. The tester was stopped when the film was elongated by 30 mm (160% of the original length), and the film was taken out. Taking the width before drawing as H0, and the narrowest width after drawing as H1, a film width shrinkage was calculated using the following equation. This procedure was repeated five times for each of the MD and TD. Film width shrinkage was defined as an average value of the film width shrinkages in the MD and TD.

$$\text{Film width shrinkage} = H1/H2 \times 100\ (\%) \quad (2)$$

(18) Opening Length at 2% Elongation

The laminated assembly prepared in (9) was cut in the longitudinal direction and the width direction into a rectangular shape 100 mm long and 10 mm wide to prepare a sample. Under the conditions of 25° C. and 63% RH, a tensile test of the sample was performed using a tensile tester (Tensilon UCT-100 manufactured by ORIENTEC Co., LTD.) at a crosshead speed of 10 mm/min and a sample length of 50 mm, and the test was stopped when the film was drawn by 2%. Thereafter, chucks were opened to take out the sample, and the sample was left to stand for 1 hour or more until warpage of the sample was stabilized. Thereafter, an opening length, a distance between the two ends of the warped sample shown in FIG. 3-6, was measured. Starting points of measurement were ends on the upper side of a polyester film. When warpage did not occur, the sample length 100 mm was used as an opening length. This procedure was repeated five times for each of the longitudinal direction and the width direction. Opening length at 2% elongation was defined as an average value of the opening lengths in the MD and TD.

Preparation of Polyester

Polyester resins used for film formation in Examples and Comparative Examples were prepared as described below.

Polyester A Examples 1 to 11 and Comparative Examples 1 to 3

A polyethylene terephthalate resin composed of 100 mol % of a terephthalic acid component (dicarboxylic acid component) and 99 mol % of an ethylene glycol component and 1 mol % of a diethylene glycol component (glycol component) (intrinsic viscosity: 0.65).

Polyester B Example 12

A polyethylene terephthalate resin composed of 100 mol % of a terephthalic acid component (dicarboxylic acid component) and 99 mol % of an ethylene glycol component and 1 mol % of a diethylene glycol component (glycol component) (intrinsic viscosity: 0.94).

Polyester C Examples 13 to 17

A polybutylene terephthalate resin composed of 100 mol % of a terephthalic acid component (dicarboxylic acid component) and 100 mol % of a 1,4-butanediol component (glycol component) (intrinsic viscosity: 1.22).

Particle master A Examples 1 to 7, 12, and Comparative Examples 1 to 3

A polyethylene terephthalate particle master comprising the polyester A and aggregated silica particles with an average particle diameter of 4 μm at a particle concentration of 6% by mass (intrinsic viscosity: 0.65).

Particle Master B Example 8

A polyethylene terephthalate particle master comprising the polyester A and aggregated silica particles with an average particle diameter of 1 μm at a particle concentration of 6% by mass (intrinsic viscosity: 0.65).

Particle Master C Example 9

A polyethylene terephthalate particle master comprising the polyester A and aggregated silica particles with an average particle diameter of 6 μm at a particle concentration of 6% by mass (intrinsic viscosity: 0.65).

Particle Master D Examples 10 and 11

A polyethylene terephthalate particle master comprising the polyester A and rutile-type titanium dioxide particles with an average particle diameter of 0.2 μm at a particle concentration of 9% by mass (intrinsic viscosity: 0.65).

Particle Master E Examples 13 to 15

A polybutylene terephthalate particle master comprising the polyester C and aggregated silica particles with an average particle diameter of 4 μm at a particle concentration of 2% by mass (intrinsic viscosity: 1.22).

Particle Master F Example 16

A polybutylene terephthalate particle master comprising the polyester C and aggregated silica particles with an average particle diameter of 1 μm at a particle concentration of 2% by mass (intrinsic viscosity: 1.22).

Particle Master G Example 17

A polybutylene terephthalate particle master comprising the polyester C and aggregated silica particles with an average particle diameter of 6 μm at a particle concentration of 2% by mass (intrinsic viscosity: 1.22).

Particle Master H Examples 24 to 26

A polyethylene terephthalate particle master comprising the polyester A and barium stearate with an average particle diameter of 0.1 μm at a particle concentration of 5% by mass (intrinsic viscosity: 0.65).

Particle Master I Example

A polyethylene terephthalate particle master comprising the polyester A and aggregated silica particles with an average particle diameter of 2 μm at a particle concentration of 4% by mass (intrinsic viscosity: 0.65).

Particle Master J Example

A polybutylene terephthalate particle master comprising the polyester C and aggregated silica particles with an average particle diameter of 2 μm at a particle concentration of 4% by mass (intrinsic viscosity: 1.22).

Coating Agent A Examples 1 to 31 and Comparative Examples 1 to 3

An acrylic resin composed of copolymer components of methyl methacrylate/ethyl acrylate/acrylic acid/N-methylolacrylamide at a ratio of 63/35/1/1 (% by mass): 3.00% by mass Melamine cross-linking agent: 0.75% by mass Colloidal silica particles (average particle diameter: 80 nm): 0.15% by mass Hexanol: 0.26% by mass Butyl cellosolve: 0.18% by mass Water: 95.66% by mass

Examples 1 to 12, 32, 33, Comparative Examples 1 to 2

The polyester species and the particle master shown in Table 1-1, Table 1-2, Table 1-3, and Table 1-4 were separately dried in a vacuum dryer at 180° C. for 4 hours to thoroughly remove water, fed to a single-screw extruder 1 in the amount shown in Table 1-1, Table 1-2, Table 1-3, and Table 1-4, melted at 280° C., passed through a filter and a gear pump to remove impurities and uniformize the extrusion rate, and then discharged through a T-die onto a cooling drum (maximum height: 0.2 μm, plated with hard chromium) controlled at 20° C. into a sheet-like form to obtain an unstretched film. At this time, the distance between a lip of the T-die and the cooling drum was set at 35 mm, and a voltage of 14 kV was electrostatically applied to the sheet using a wire electrode with a diameter of 0.1 mm to bring the sheet into close contact with the cooling drum. The transit speed of the sheet through the cooling drum was set at 25 m/min, and the contact length between the sheet and the cooling drum at 2.5 m.

The unstretched monolayer film was then preheated with rolls heated to a temperature of 60 to 80° C., stretched in the longitudinal direction (machine direction) to a magnification shown in Table 2-1 and 2-4 using a heating roll at 88° C., and cooled with rolls at 25° C. to obtain a uniaxially-stretched film.

This uniaxially-stretched film was subjected to corona discharge treatment in air, and the coating agent A described below mixed by ultrasonic dispersion was uniformly applied to the treated surface using a #4 metering bar to form an adhesion-improving layer.

The uniaxially-stretched film was then guided to a preheating zone at 90° C. in a tenter with its both ends held by clips, and continuously stretched in a heating zone maintained at 100° C. in the direction (width direction) perpendicular to the longitudinal direction to a magnification shown in Table 2-1 and 2-4. Furthermore, the film was then heat-treated at 240° C. for 20 seconds in a heat treatment zone in the tenter, and then relaxed in the width direction by 4% at 240° C. The film was then slowly cooled uniformly to obtain a polyester film with a thickness of 25 μm. The properties of the polyester films are as shown in Table 2-1, Table 2-2, Table 2-4, and Table 2-5.

The polyester film obtained and aluminum foil (BESPA 8021 available from Sumikei Aluminum Foil Co., Ltd.) with a thickness of 40 μm were laminated to each other by dry lamination using TAKELAC A-910 (polyol base resin)/TAKENATE A-3 (isocyanate curing agent) two-component adhesive (100 parts by weight/10 parts by weight) available from Mitsui Chemical Polyurethane Co., Ltd. Here, the adhesive was applied to the adhesion-improving coating side of the polyester film in an amount of 5 g/m² in terms of solid content, and after the lamination, aging was performed at 40° C. for 72 hours to obtain a laminate. The properties of the laminates are as shown in Table 2-1 and Table 2-4.

On the aluminum foil of the laminate obtained, a two-layer coextruded film obtained by coextrusion of maleic acid-modified polypropylene resin and polypropylene (maleic acid-modified polypropylene resin layer: 20 μm, polypropylene resin layer: 60 μm) was laminated as a sealant by thermocompression bonding (160° C., 0.3 MPa, 2 m/min) using a laminator with the maleic acid-modified polypropylene resin layer being located at the side of the aluminum foil to prepare a laminated assembly of polyester film/aluminum foil/sealant. The evaluation results of the laminated assemblies obtained are as shown in Table 2-3 and Table 2-6, and the laminated assemblies of Examples 1 to 12, 32, and 33 were excellent in delamination resistance, mold conformability, reduction of wrinkles of a molded product, and post-molding warpage.

In Example 2, the maximum surface height was 1800 nm or more on both surfaces, and thus more excellent post-molding warpage was provided. In Examples 4, 6, 8, 11, 13, and 15, the maximum surface height was 2000 nm or more, and thus still more excellent post-molding warpage was provided. In Examples 7, 9, 14, 16, and 33, the maximum surface height was 5000 nm or more on both surfaces, and thus most excellent post-molding warpage was provided.

In Examples 3, 6, 8, 11, and 32, the breaking elongation of the laminate was 30% or more in both the longitudinal direction and the width direction, and thus the laminated assembly had more excellent mold conformability. In Example 5 and Example 11, the breaking elongation was 38% or more in both the longitudinal direction and the width direction, and thus the laminated assembly had still more excellent mold conformability.

In Example 12, although the laminated assembly had most excellent mold conformability since the breaking strength was 330 MPa or more, the stretching magnification during production of a polyester film was too high, and breakage occurred frequently during film formation, resulting in low productivity.

On the other hand, the laminated assemblies of Comparative Examples were poor for the reasons below.

In Comparative Example 1, the maximum surface height was less than 1500 nm on both surfaces, and thus the post-molding warpage was poor.

In Comparative Example 2, the breaking elongation of the laminate was less than 20%, and thus the laminated assembly had poor mold conformability.

Examples 13 to 17, 34, and 35

The polyester species and the particle master shown in Table 1-1, Table 1-2, Table 1-3, and Table 1-4 were separately dried in a vacuum dryer at 150° C. for 4 hours to thoroughly remove water, fed to a single-screw extruder in the amount shown in Table 1-1, Table 1-2, Table 1-3, and Table 1-4, and then melted at 255° C. The resulting melted tubular thin film was extruded downward through a ring die. The film was then passed around a cooling mandrel, folded with a roll, and then taken up with a nip roll to obtain an unstretched sheet. The unstretched sheet was then biaxially stretched simultaneously in the machine and transverse directions using a tubular simultaneous biaxially stretching apparatus. The stretching temperature in the Examples is 60° C., and the stretching magnification is as shown in Table 2-1 and Table 2-2. This biaxially-stretched film was then heat-treated at 210° C. using a tenter-type heat treatment apparatus and corona-treated to obtain a polyester film. Except for the above, the same procedure as in Example 1 was repeated to obtain a laminate. The evaluation results of the laminated assemblies obtained are as shown in Table 2-3 and Table 2-6, and the laminated assemblies of Examples 12 to 16 were excellent in delamination resistance, mold conformability, reduction of wrinkles of a molded product, and post-molding warpage.

In Examples 14 and 16, the maximum surface height was 2000 nm or more on both surfaces, and thus more excellent post-molding warpage was provided. In Examples 15, 17, and 35, the maximum surface height was 5000 nm or more on both surfaces, and thus most excellent post-molding warpage was provided.

In Examples 13, 16, and 34, the breaking elongation of the laminate was 30% or more in both the longitudinal direction and the width direction, and thus the laminated assembly had more excellent mold conformability. In Example 15, the breaking elongation was 38% or more in both the longitudinal direction and the width direction, and thus the laminated assembly had still more excellent mold conformability.

Examples 18 to 29

The extruder 1 and an extruder 2 were used. A material for P1 layer was charged into the extruder 1, and a material for P2 layer and P3 layer into the extruder 2. The materials, which were the polyester species and the particle master species shown in Table 1-1, Table 1-2, Table 1-3, and Table 1-4, were separately melted. The resins melt-extruded from the extruders were then guided to a feed block, where the resins were joined such that they were laminated in the order of P2 layer/P1 layer/P3 layer at a lamination ratio shown in Table 1-2 and Table 1-4, and the resin discharged from a die was allowed to cool and solidify on a casting drum to obtain a laminated sheet. The transit speed of the sheet through the cooling drum was set at 25 m/min, and the contact length between the sheet and the cooling drum at 2.5 m.

The unstretched monolayer film was then preheated with rolls heated to a temperature of 60 to 80° C., stretched in the longitudinal direction (machine direction) to a magnification shown in Table 2-1 and Table 2-4 using a heating roll at 88° C., and cooled with rolls at 25° C. to obtain a uniaxially-stretched film.

This uniaxially-stretched film was subjected to corona discharge treatment in air, and the coating agent A described below mixed by ultrasonic dispersion was uniformly applied to the treated surface using a #4 metering bar to form an adhesion-improving layer.

The uniaxially-stretched film was then guided to a preheating zone at 90° C. in a tenter with its both ends held by clips, and continuously stretched in a heating zone maintained at 100° C. in the direction (width direction) perpendicular to the longitudinal direction to a magnification shown in Table 2-1 and Table 2-4. Furthermore, the film was then heat-treated at 225° C. for 20 seconds in a heat treatment zone in the tenter, and then relaxed in the width direction by 5% at 225° C. The film was then slowly cooled uniformly to obtain a polyester film with a thickness of 25 µm. Except for the above, the same procedure as in Example 1 was repeated to obtain a laminate. The evaluation results of the laminated assemblies obtained are as shown in Table 2-3 and Table 2-6, and the laminated assemblies of Examples 18 to 29 were excellent in delamination resistance, mold conformability, reduction of wrinkles of a molded product, and post-molding warpage.

In Examples 18, 19, 26, 28, and 29, the maximum surface height was 2000 nm or more on both surfaces, and thus more excellent post-molding warpage was provided. In Example 20, the maximum surface height was 5000 nm or more on both surfaces, and thus most excellent post-molding warpage was provided.

In Examples 20, 21, 22, 23, and 29, the breaking elongation of the laminate was 30% or more in both the longitudinal direction and the width direction, and thus the laminated assembly had more excellent mold conformability. In Examples 18, 19, and 24 to 28, the breaking elongation was 38% or more in both the longitudinal direction and the width direction, and thus the laminated assembly had still more excellent mold conformability.

Example 30 and 31

The extruder 1 and the extruder 2 were used. A material for P1 layer was charged into the extruder 1, and a material for P2 layer and P3 layer into the extruder 2. The materials, which were the polyester species and the particle master species shown in Table 1-3, were separately melted. The resins melt-extruded from the extruders were then guided to a feed block, where the resins were joined such that they were laminated in the order of P2 layer/P1 layer/P3 layer at a lamination ratio shown in Table 1-4, and the resulting melted tubular thin film was extruded downward through a ring die. Except for the above, the same procedure as in Example 13 was repeated to obtain a laminate. The evaluation results of the laminated assemblies obtained are as shown in Table 2-6, and the laminated assemblies of Example 30 and 31 were excellent in delamination resistance, mold conformability, reduction of wrinkles of a molded product, and post-molding warpage.

In Examples 30 and 31, the maximum surface height was 2000 nm or more on both surfaces, and thus more excellent post-molding warpage was provided.

In Examples 30 and 31, the breaking elongation of the laminate was 30% or more in both the longitudinal direction and the width direction, and thus the laminated assembly had more excellent mold conformability.

Comparative Examples 3 and 4

The extruder 1 and the extruder 2 were used. In each extruder, the polyester species and the particle master shown in Table 1-3, which had been separately dried in a vacuum dryer at 180° C. for 4 hours to thoroughly remove water, were melted at 280° C. Subsequently, P1 layer, a layer melt-extruded from the extruder 1 to be bonded to metal foil, and P2 layer, a layer from the extruder 2 not to be bonded to metal foil, were laminated in the order of P1 layer/P2 layer, and the layers were joined at a multi-manifold such that the P1 layer and the P2 layer had a thickness shown in Table 1-4. The resin discharged from a die was allowed to cool and solidify on a casting drum to obtain a laminated sheet. Except for the above, the same procedure as in Example 1 was repeated to obtain a laminate.

In Comparative Example 3, the maximum surface roughness (SRmax) of the polyester film on the surface to be bonded to the metal foil (A) was more than 7000 nm, and thus the post-molding wrinkles was poor.

In Comparative Example 4, the maximum surface roughness (SRmax) of the polyester film on the surface not to be bonded to the metal foil (A) was more than 7000 nm, and thus the delamination resistance was poor.

TABLE 1-1

| | Metal foil (A) | | Polyester film | | | | | |
|---|---|---|---|---|---|---|---|---|
| | | | P1 layer | | | P2 layer | | |
| | Type | Thickness (µm) | Polyester species | Particle master species | Amount of particle master (% by mass) | Polyester species | Particle master species | Amount of particle master (% by mass) |
| Example 1 | AL | 40 | Polyester A | Master A | 1.6 | — | — | — |
| Example 2 | AL | 40 | Polyester A | Master A | 3.3 | — | — | — |
| Example 3 | AL | 40 | Polyester A | Master A | 1.6 | — | — | — |
| Example 4 | AL | 40 | Polyester A | Master A | 6.6 | — | — | — |
| Example 5 | AL | 40 | Polyester A | Master A | 1.6 | — | — | — |

TABLE 1-1-continued

| | Metal foil (A) | | Polyester film | | | | | |
|---|---|---|---|---|---|---|---|---|
| | | | P1 layer | | | P2 layer | | |
| | Type | Thickness (μm) | Polyester species | Particle master species | Amount of particle master (% by mass) | Polyester species | Particle master species | Amount of particle master (% by mass) |
| Example 6 | AL | 40 | Polyester A | Master A | 10 | — | — | — |
| Example 7 | AL | 40 | Polyester A | Master A | 15 | — | — | — |
| Example 8 | AL | 40 | Polyester A | Master B | 10 | — | — | — |
| Example 9 | AL | 40 | Polyester A | Master C | 10 | — | — | — |
| Example 10 | AL | 40 | Polyester A | Master D | 10 | — | — | — |
| Example 11 | AL | 40 | Polyester A | Master D | 44.4 | — | — | — |
| Example 12 | AL | 40 | Polyester B | Master A | 1.6 | — | — | — |
| Example 13 | AL | 40 | Polyester C | Master E | 1.6 | — | — | — |
| Example 14 | AL | 40 | Polyester C | Master E | 10 | — | — | — |
| Example 15 | AL | 40 | Polyester C | Master E | 15 | — | — | — |
| Example 16 | AL | 40 | Polyester C | Master F | 10 | — | — | — |
| Example 17 | AL | 40 | Polyester C | Master G | 10 | — | — | — |
| Example 18 | AL | 40 | Polyester A | — | — | Polyester A | Master A | 5 |
| Example 19 | AL | 40 | Polyester A | — | — | Polyester A | Master A | 10 |
| Example 20 | AL | 40 | Polyester A | — | — | Polyester A | Master A | 20 |

TABLE 1-2

| | Polyester film | | | | |
|---|---|---|---|---|---|
| | P3 layer | | | | |
| | Polyester species | Particle master species | Amount of particle master (% by mass) | Lamination ratio | Amount of particles in film (% by mass) |
| Example 1 | — | — | — | — | 0.10 |
| Example 2 | — | — | — | — | 0.20 |
| Example 3 | — | — | — | — | 0.10 |
| Example 4 | — | — | — | — | 0.40 |
| Example 5 | — | — | — | — | 0.10 |
| Example 6 | — | — | — | — | 0.60 |
| Example 7 | — | — | — | — | 0.90 |
| Example 8 | — | — | — | — | 0.60 |
| Example 9 | — | — | — | — | 0.60 |
| Example 10 | — | — | — | — | 0.90 |
| Example 11 | — | — | — | — | 4.00 |
| Example 12 | — | — | — | — | 0.10 |
| Example 13 | — | — | — | — | 0.10 |
| Example 14 | — | — | — | — | 0.60 |
| Example 15 | — | — | — | — | 0.90 |
| Example 16 | — | — | — | — | 0.60 |
| Example 17 | — | — | — | — | 0.60 |
| Example 18 | Polyester A | Master A | 5 | 1:8:1 | 0.06 |
| Example 19 | Polyester A | Master A | 10 | 1:8:1 | 0.12 |
| Example 20 | Polyester A | Master A | 20 | 1:8:1 | 0.24 |

TABLE 1-3

| | Metal foil (A) | | Polyester film | | | | | |
|---|---|---|---|---|---|---|---|---|
| | | | P1 layer | | | P2 layer | | |
| | Type | Thickness (μm) | Polyester species | Particle master species | Amount of particle master (% by mass) | Polyester species | Particle master species | Amount of particle master (% by mass) |
| Example 21 | AL | 40 | Polyester A | Master A | 5 | Polyester A | Master B | 0.6 |
| Example 22 | AL | 40 | Polyester A | Master A | 10 | Polyester A | Master B | 0.6 |
| Example 23 | AL | 40 | Polyester A | Master A | 20 | Polyester A | Master B | 0.6 |
| Example 24 | AL | 40 | Polyester A | — | — | Polyester A | Master H | 5 |
| Example 25 | AL | 40 | Polyester A | — | — | Polyester A | Master H | 10 |

TABLE 1-3-continued

| | Metal foil (A) | | Polyester film | | | | | |
|---|---|---|---|---|---|---|---|---|
| | | | P1 layer | | | P2 layer | | |
| | Type | Thickness (μm) | Polyester species | Particle master species | Amount of particle master (% by mass) | Polyester species | Particle master species | Amount of particle master (% by mass) |
| Example 26 | AL | 40 | Polyester A | — | — | Polyester A | Master H | 20 |
| Example 27 | AL | 40 | Polyester A | — | — | Polyester A | Master B | 5 |
| Example 28 | AL | 40 | Polyester A | — | — | Polyester A | Master B | 10 |
| Example 29 | AL | 40 | Polyester A | — | — | Polyester A | Master B | 20 |
| Example 30 | AL | 40 | Polyester C | — | — | Polyester C | Master E | 10 |
| Example 31 | AL | 40 | Polyester C | — | — | Polyester C | Master F | 10 |
| Example 32 | AL | 40 | Polyester A | Master I | 3.5 | — | — | — |
| Example 33 | AL | 40 | Polyester A | Master C | 27 | — | — | — |
| Example 34 | AL | 40 | Polyester C | Master J | 3.5 | — | — | — |
| Example 35 | AL | 40 | Polyester C | Master G | 27 | — | — | — |
| Comparative Example 1 | AL | 40 | Polyester A | Master A | 0.8 | — | — | — |
| Comparative Example 2 | AL | 40 | Polyester A | Master A | 10 | — | — | — |
| Comparative Example 3 | AL | 40 | Polyester A | Master A | 35 | Polyester A | Master B | 0.1 |
| Comparative Example 4 | AL | 40 | Polyester A | Master B | 0.1 | Polyester A | Master A | 35 |

TABLE 1-4

| | Polyester film | | | | |
|---|---|---|---|---|---|
| | P3 layer | | | | |
| | Polyester species | Particle master species | Amount of particle master (% by mass) | Lamination ratio | Amount of particles in film (% by mass) |
| Example 21 | Polyester A | Master B | 0.6 | 1:8:1 | 0.25 |
| Example 22 | Polyester A | Master B | 0.6 | 1:8:1 | 0.49 |
| Example 23 | Polyester A | Master B | 0.6 | 1:8:1 | 0.97 |
| Example 24 | Polyester A | Master H | 5 | 1:8:1 | 0.05 |
| Example 25 | Polyester A | Master H | 10 | 1:8:1 | 0.10 |
| Example 26 | Polyester A | Master H | 20 | 1:8:1 | 0.20 |
| Example 27 | Polyester A | Master B | 5 | 1:8:1 | 0.09 |
| Example 28 | Polyester A | Master B | 10 | 1:8:1 | 0.18 |
| Example 29 | Polyester A | Master B | 20 | 1:8:1 | 0.36 |
| Example 30 | Polyester C | Master E | 10 | 1:8:1 | 0.12 |
| Example 31 | Polyester C | Master F | 10 | 1:8:1 | 0.18 |
| Example 32 | — | — | — | — | 0.14 |
| Example 33 | — | — | — | — | 1.60 |
| Example 34 | — | — | — | — | 0.14 |
| Example 35 | — | — | — | — | 1.60 |
| Comparative Example 1 | — | — | — | — | 0.05 |
| Comparative Example 2 | — | — | — | — | 0.60 |
| Comparative Example 3 | — | — | — | — | 0.25 |
| Comparative Example 4 | — | — | — | — | 0.25 |

TABLE 2-1

| | Properties of laminate Breaking elongation (%) | | Stretching magnification of polyester film | | Properties of polyester film | | Breaking elongation (%) | | Breaking strength (MPa) | |
|---|---|---|---|---|---|---|---|---|---|---|
| | | | | | Maximum surface height (nm) | | | | | |
| | | | | | Surface to be bonded to metal foil (A) SRmax (nm) | Surface not to be bonded to metal foil (A) SRmax (nm) | | | | |
| | MD | TD | Machine direction | Width direction | | | MD | TD | MD | TD |
| Example 1 | 25 | 25 | 3.3 | 3.3 | 1560 | 1535 | 191 | 162 | 230 | 222 |
| Example 2 | 20 | 20 | 3.3 | 3.3 | 1890 | 1825 | 183 | 151 | 235 | 220 |
| Example 3 | 33 | 33 | 3.5 | 3.5 | 1560 | 1544 | 153 | 131 | 265 | 255 |
| Example 4 | 23 | 23 | 3.5 | 3.5 | 3650 | 3520 | 133 | 119 | 245 | 241 |
| Example 5 | 40 | 40 | 3.8 | 3.8 | 1603 | 1655 | 123 | 124 | 305 | 303 |
| Example 6 | 32 | 32 | 3.8 | 3.8 | 4026 | 4122 | 105 | 102 | 265 | 257 |

TABLE 2-1-continued

| | Properties of laminate Breaking elongation (%) | | Stretching magnification of polyester film | | Properties of polyester film | | Breaking elongation (%) | | Breaking strength (MPa) | |
|---|---|---|---|---|---|---|---|---|---|---|
| | | | | | Maximum surface height (nm) | | | | | |
| | | | | | Surface to be bonded to metal foil (A) SRmax (nm) | Surface not to be bonded to metal foil (A) SRmax (nm) | | | | |
| | MD | TD | Machine direction | Width direction | | | MD | TD | MD | TD |
| Example 7 | 22 | 22 | 3.8 | 3.8 | 5075 | 5150 | 86 | 84 | 243 | 225 |
| Example 8 | 32 | 32 | 3.8 | 3.8 | 2321 | 2256 | 121 | 123 | 278 | 271 |
| Example 9 | 21 | 23 | 3.8 | 3.8 | 5244 | 5123 | 91 | 93 | 244 | 235 |
| Example 10 | 43 | 41 | 3.8 | 3.8 | 1570 | 1546 | 125 | 110 | 288 | 278 |
| Example 11 | 35 | 34 | 3.8 | 3.8 | 2305 | 2287 | 105 | 101 | 265 | 255 |
| Example 12 | 45 | 47 | 3.8 | 4.2 | 1603 | 1610 | 123 | 124 | 335 | 342 |
| Example 13 | 33 | 33 | 3.5 | 3.5 | 1623 | 1658 | 137 | 95 | 210 | 255 |
| Example 14 | 23 | 23 | 3.5 | 3.5 | 4089 | 4154 | 105 | 75 | 205 | 243 |
| Example 15 | 40 | 40 | 3.5 | 3.5 | 5105 | 5165 | 95 | 70 | 203 | 245 |
| Example 16 | 32 | 32 | 3.5 | 3.5 | 2361 | 2410 | 110 | 82 | 210 | 241 |
| Example 17 | 22 | 22 | 3.5 | 3.5 | 5360 | 5420 | 88 | 65 | 205 | 243 |
| Example 18 | 40 | 42 | 3.8 | 3.8 | 3520 | 3450 | 125 | 110 | 278 | 285 |
| Example 19 | 39 | 40 | 3.8 | 3.8 | 4010 | 4200 | 123 | 108 | 275 | 280 |
| Example 20 | 33 | 35 | 3.8 | 3.8 | 5523 | 5688 | 118 | 110 | 272 | 278 |

TABLE 2-2

| | Properties of polyester film | | | | | | | |
|---|---|---|---|---|---|---|---|---|
| | P1 layer thickness (μm) | P2 layer thickness (μm) | P3 layer thickness (μm) | Total heat shrinkage at 150° C. (%) | Total heat shrinkage at 200° C. (%) | Internal haze (%) | Surface haze (%) | Film width shrinkage (%) |
| Example 1 | 25 | — | — | 0.5 | 1.4 | 18.5 | 2.8 | 41.2 |
| Example 2 | 25 | — | — | 0.4 | 1.2 | 25.9 | 4.1 | 36.2 |
| Example 3 | 25 | — | — | 0.7 | 2.2 | 21.5 | 3.2 | 42.2 |
| Example 4 | 25 | — | — | 0.6 | 2.0 | 32.6 | 3.5 | 36.8 |
| Example 5 | 25 | — | — | 1.5 | 3.5 | 22.8 | 3.6 | 40.5 |
| Example 6 | 25 | — | — | 1.3 | 2.7 | 38.2 | 4.5 | 34.7 |
| Example 7 | 25 | — | — | 1.1 | 2.2 | 48.5 | 5.5 | 31.0 |
| Example 8 | 25 | — | — | 1.1 | 2.2 | 15.2 | 3.5 | 34.5 |
| Example 9 | 25 | — | — | 1.1 | 2.3 | 45.3 | 5.2 | 34.2 |
| Example 10 | 25 | — | — | 1.0 | 2.2 | 82.5 | 1.5 | 38.0 |
| Example 11 | 25 | — | — | 0.9 | 2.0 | 92.5 | 2.5 | 36.0 |
| Example 12 | 25 | — | — | 1.7 | 4.5 | 22.5 | 3.3 | 40.6 |
| Example 13 | 25 | — | — | 0.9 | 2.2 | 23.5 | 3.1 | 39.5 |
| Example 14 | 25 | — | — | 1.0 | 2.3 | 41.2 | 4.6 | 33.9 |
| Example 15 | 25 | — | — | 1.1 | 2.1 | 46.2 | 5.2 | 26.5 |
| Example 16 | 25 | — | — | 1.1 | 1.9 | 16.8 | 3.3 | 33.5 |
| Example 17 | 25 | — | — | 1.3 | 2.2 | 43.9 | 5.3 | 34.2 |
| Example 18 | 20 | 2.5 | 2.5 | 2.4 | 7.1 | 4.5 | 2.3 | 41.5 |
| Example 19 | 20 | 2.5 | 2.5 | 2.2 | 6.6 | 5.8 | 4.1 | 40.3 |
| Example 20 | 20 | 2.5 | 2.5 | 2.0 | 6.2 | 7.5 | 6.8 | 36.7 |

TABLE 2-3

| | Evaluation of laminated assembly | | | | |
|---|---|---|---|---|---|
| | Delamination resistance | Mold conformability of laminated assembly | Warp resistance of laminated assembly | Post-molding wrinkles | Opening length at 2% elongation (mm) |
| Example 1 | A | B | C | A | 35 |
| Example 2 | A | B | B | A | 41 |
| Example 3 | A | A | C | A | 36 |
| Example 4 | A | B | A | A | 45 |
| Example 5 | A | S | C | A | 37 |
| Example 6 | A | A | A | A | 51 |
| Example 7 | A | B | S | A | 92 |
| Example 8 | A | A | A | A | 52 |

TABLE 2-3-continued

| | Evaluation of laminated assembly | | | | |
|---|---|---|---|---|---|
| | Delamination resistance | Mold conformability of laminated assembly | Warp resistance of laminated assembly | Post-molding wrinkles | Opening length at 2% elongation (mm) |
| Example 9 | A | B | S | A | 48 |
| Example 10 | A | S | B | A | 43 |
| Example 11 | A | A | A | A | 65 |
| Example 12 | A | S | C | A | 38 |
| Example 13 | A | S | C | A | 45 |
| Example 14 | A | A | A | A | 78 |
| Example 15 | A | B | S | A | 95 |
| Example 16 | A | A | A | A | 88 |
| Example 17 | A | B | S | A | 86 |
| Example 18 | A | A | A | A | 34 |
| Example 19 | A | A | A | A | 36 |
| Example 20 | A | A | S | A | 51 |

TABLE 2-4

| | Properties of laminate Breaking elongation (%) | | Stretching magnification of polyester film | | Properties of polyester film | | | | | |
|---|---|---|---|---|---|---|---|---|---|---|
| | | | | | Maximum surface height (nm) | | Breaking elongation (%) | | Breaking strength (MPa) | |
| | | | | | Surface to be bonded to metal foil (A) SRmax (nm) | Surface not to be bonded to metal foil (A) SRmax (nm) | | | | |
| | MD | TD | Machine direction | Width direction | | | MD | TD | MD | TD |
| Example 21 | 35 | 42 | 3.8 | 3.8 | 1870 | 1920 | 125 | 118 | 240 | 250 |
| Example 22 | 30 | 40 | 3.8 | 3.8 | 1950 | 1920 | 120 | 110 | 220 | 238 |
| Example 23 | 25 | 38 | 3.8 | 3.8 | 1910 | 1870 | 105 | 85 | 210 | 220 |
| Example 24 | 44 | 45 | 3.8 | 3.8 | 1510 | 1520 | 118 | 120 | 280 | 290 |
| Example 25 | 43 | 42 | 3.8 | 3.8 | 1805 | 1820 | 128 | 115 | 280 | 285 |
| Example 26 | 40 | 40 | 3.8 | 3.8 | 2100 | 2150 | 116 | 124 | 275 | 282 |
| Example 27 | 39 | 40 | 3.8 | 3.8 | 1532 | 1658 | 127 | 121 | 280 | 285 |
| Example 28 | 39 | 41 | 3.8 | 3.8 | 2355 | 2409 | 123 | 117 | 270 | 278 |
| Example 29 | 32 | 34 | 3.8 | 3.8 | 4050 | 4650 | 115 | 105 | 261 | 278 |
| Example 30 | 34 | 32 | 3.8 | 3.8 | 4156 | 4550 | 118 | 110 | 210 | 220 |
| Example 31 | 30 | 31 | 3.8 | 3.8 | 2512 | 2653 | 110 | 103 | 205 | 218 |
| Example 32 | 36 | 37 | 3.8 | 3.7 | 1725 | 1744 | 115 | 119 | 289 | 280 |
| Example 33 | 22 | 23 | 3.8 | 3.7 | 6825 | 6652 | 88 | 85 | 210 | 225 |
| Example 34 | 35 | 33 | 3.5 | 3.5 | 1658 | 1688 | 132 | 92 | 205 | 243 |
| Example 35 | 22 | 21 | 3.5 | 3.5 | 6654 | 6521 | 88 | 65 | 201 | 221 |
| Comparative Example 1 | 41 | 41 | 3.8 | 3.8 | 850 | 872 | 130 | 125 | 308 | 302 |
| Comparative Example 2 | 17 | 16 | 3.3 | 3.3 | 3526 | 5466 | 170 | 155 | 180 | 175 |
| Comparative Example 3 | 35 | 34 | 3.8 | 3.8 | 7250 | 52 | 110 | 112 | 256 | 258 |
| Comparative Example 4 | 33 | 32 | 3.8 | 3.8 | 55 | 7450 | 108 | 105 | 264 | 258 |

TABLE 2-5

| | Properties of polyester film | | | | | | | |
|---|---|---|---|---|---|---|---|---|
| | P1 layer thickness (μm) | P2 layer thickness (μm) | P3 layer thickness (μm) | Total heat shrinkage at 150° C. (%) | Total heat shrinkage at 200° C. (%) | Internal haze (%) | Surface haze (%) | Film width shrinkage (%) |
| Example 21 | 20 | 2.5 | 2.5 | 2.5 | 7.4 | 30.6 | 2.1 | 36.2 |
| Example 22 | 20 | 2.5 | 2.5 | 2.4 | 7.1 | 35.6 | 2.2 | 31.5 |
| Example 23 | 20 | 2.5 | 2.5 | 2.2 | 6.8 | 52.9 | 2.1 | 26.8 |
| Example 24 | 20 | 2.5 | 2.5 | 2.5 | 7.6 | 1.5 | 1.5 | 41.7 |
| Example 25 | 20 | 2.5 | 2.5 | 2.4 | 7.2 | 1.5 | 1.5 | 40.2 |
| Example 26 | 20 | 2.5 | 2.5 | 2.3 | 7.5 | 1.5 | 1.5 | 36.8 |
| Example 27 | 20 | 2.5 | 2.5 | 2.3 | 6.9 | 4.3 | 2.1 | 40.5 |
| Example 28 | 20 | 2.5 | 2.5 | 2.2 | 6.6 | 5.5 | 4.2 | 38.6 |
| Example 29 | 20 | 2.5 | 2.5 | 2.0 | 6.3 | 7.3 | 6.7 | 32.6 |
| Example 30 | 20 | 2.5 | 2.5 | 1.5 | 5.5 | 5.7 | 4.2 | 38.5 |

TABLE 2-5-continued

| | Properties of polyester film | | | | | | | |
|---|---|---|---|---|---|---|---|---|
| | P1 layer thickness (μm) | P2 layer thickness (μm) | P3 layer thickness (μm) | Total heat shrinkage at 150° C. (%) | Total heat shrinkage at 200° C. (%) | Internal haze (%) | Surface haze (%) | Film width shrinkage (%) |
| Example 31 | 20 | 2.5 | 2.5 | 1.5 | 5.5 | 5.7 | 4.3 | 37.8 |
| Example 32 | 25 | — | — | 1.4 | 3.4 | 14.2 | 2.4 | 40.8 |
| Example 33 | 25 | — | — | 1.0 | 2.1 | 66.8 | 6.9 | 26.2 |
| Example 34 | 25 | — | — | 0.8 | 2.2 | 16.7 | 2.8 | 38.6 |
| Example 35 | 25 | — | — | 0.8 | 1.6 | 68.2 | 7.2 | 25.6 |
| Comparative Example 1 | 25 | — | — | — | — | 9.5 | 1.8 | 41.6 |
| Comparative Example 2 | 25 | — | — | — | — | 38.5 | 4.3 | 34.5 |
| Comparative Example 3 | 3 | 22 | — | — | — | 75.8 | 7.5 | 38.6 |
| Comparative Example 4 | 22 | 3 | — | — | — | 73.5 | 1.5 | 37.5 |

TABLE 2-6

| | Evaluation of laminated assembly | | | | |
|---|---|---|---|---|---|
| | Delamination resistance | Mold conformability of laminated assembly | Warp resistance of laminated assembly | Post-molding wrinkles | Opening length at 2% elongation (mm) |
| Example 21 | A | A | A | A | 53 |
| Example 22 | A | A | A | A | 68 |
| Example 23 | A | A | A | A | 91 |
| Example 24 | A | S | C | A | 35 |
| Example 25 | A | S | B | A | 42 |
| Example 26 | A | S | B | A | 52 |
| Example 27 | A | A | C | A | 41 |
| Example 28 | A | A | A | A | 45 |
| Example 29 | A | A | A | A | 68 |
| Example 30 | A | A | A | A | 65 |
| Example 31 | A | A | A | A | 63 |
| Example 32 | A | A | C | A | 37 |
| Example 33 | A | B | S | A | 98 |
| Example 34 | A | A | C | A | 46 |
| Example 35 | A | B | S | A | 97 |
| Comparative Example 1 | A | A | D | A | 32 |
| Comparative Example 2 | A | C | A | A | 53 |
| Comparative Example 3 | A | A | S | Poor | 38 |
| Comparative Example 4 | C | A | A | A | 37 |

INDUSTRIAL APPLICABILITY

The laminate, due to the maximum surface height of a polyester surface bonded to metal foil in a specific range, is excellent in warp resistance and reduction of post-molding wrinkles of a molded product and also has reduced delamination between the metal foil and the polyester surface, and, due to having a breaking elongation of 20% or more in at least one direction, has excellent moldability. Thus, the laminate can be suitably used in a laminated assembly for battery casings adaptable to higher capacities and a laminated assembly for pharmaceutical packaging adaptable to various shapes.

The invention claimed is:

1. A polyester film, having a maximum surface height on a surface A side (SRmaxA) of 1500 nm to 7000 nm, a maximum surface height on a surface B side (SRmaxB) of 5 nm or more but less than 7000 nm, the SRmaxA and the SRmaxB satisfying $$SRmaxA > SRmaxB \qquad (1)$$

and a strength at break at 25° C. of 200 MPa to 330 MPa in both a longitudinal direction and a width direction.

2. The polyester film according to claim 1, having an internal haze of 10% to 70% and a surface haze of 2% to 20%.

3. The polyester film according to claim 1, having a film width shrinkage in a direction perpendicular to a strain direction at 60% elongation of 25% to 40%.

4. The polyester film according to claim 1, having a thickness of 15 μm to 40 μm.

5. The polyester film according to claim 1, comprising a glycol unit, 95 mol % or more of which is a structural unit derived from ethylene glycol, and a dicarboxylic acid unit, 95 mol % or more of which is a structural unit derived from terephthalic acid.

6. The polyester film according to claim 1, comprising a glycol unit, 95 mol % or more of which is a structural unit derived from 1,4-butanediol, and a dicarboxylic acid unit, 95 mol % or more of which is a structural unit derived from terephthalic acid.

7. The polyester film according to claim 1, which is a laminated film having a polyester A layer and a polyester B layer, the particle concentration in the polyester B layer being lower than that in the polyester A layer.

8. A battery casing comprising the polyester film according to claim 1.

9. A pharmaceutical packaging film comprising the polyester film according to claim 1.

10. A laminate comprising a metal foil (A) with a thickness of 10 μm to 100 μm and the polyester film according to claim 1 formed on at least one surface of the metal foil (A) as an outermost layer, the laminate having a breaking elongation at 25° C. of 20% or more in at least one direction.

11. A laminated assembly comprising the laminate according to claim 10, and a sealant layer formed on the laminate, the laminated assembly having a configuration of polyester film/metal foil/sealant layer and an opening length at 2% elongation of 40 mm to 100 mm.

* * * * *